United States Patent
Qiu et al.

(10) Patent No.: US 11,895,764 B1
(45) Date of Patent: Feb. 6, 2024

(54) NEEDLE-BASED SYNERGISTIC DOUBLE HELIX ELECTRODE DIELECTRIC BARRIER DISCHARGING TUBE

(71) Applicant: HANGZHOU CITY UNIVERSITY, Hangzhou (CN)

(72) Inventors: Qi Qiu, Hangzhou (CN); Pengfei Wang, Hangzhou (CN); Qinmin Yang, Hangzhou (CN)

(73) Assignee: HANGZHOU CITY UNIVERSITY, Hangzhou (CN)

( * ) Notice: Subject to any disclaimer, the term of this patent is extended or adjusted under 35 U.S.C. 154(b) by 0 days.

(21) Appl. No.: 18/346,266

(22) Filed: Jul. 2, 2023

(30) Foreign Application Priority Data

Feb. 16, 2023 (CN) .......................... 202310123450.9

(51) Int. Cl.
*H05H 1/24* (2006.01)
(52) U.S. Cl.
CPC .......... *H05H 1/245* (2021.05); *H05H 1/2439* (2021.05)
(58) Field of Classification Search
None
See application file for complete search history.

(56) References Cited

U.S. PATENT DOCUMENTS

| | | | |
|---|---|---|---|
| 9,155,737 B2* | 10/2015 | Springer | A61P 21/00 |
| 9,269,544 B2* | 2/2016 | Koo | H05H 1/2406 |
| 9,433,071 B2* | 8/2016 | Zaidi | H05H 1/2406 |
| 9,437,401 B2* | 9/2016 | Watson | A61N 1/44 |
| 10,167,220 B2* | 1/2019 | Boughton | H05B 7/22 |
| 11,266,003 B2* | 3/2022 | Mujahid | H05H 1/2406 |
| 2015/0343231 A1* | 12/2015 | Sanders | A61L 2/0011 607/2 |
| 2017/0106200 A1* | 4/2017 | Sanders | A61L 2/14 |
| 2018/0138022 A1* | 5/2018 | Lam | H01J 37/32825 |
| 2019/0011400 A1* | 1/2019 | Nacson | H01J 37/32027 |
| 2019/0120219 A1* | 4/2019 | Calomeris | H05H 1/2406 |
| 2020/0221563 A1* | 7/2020 | Chesny | H01J 37/32 |

FOREIGN PATENT DOCUMENTS

| | | | | |
|---|---|---|---|---|
| CN | 114797406 A | | 7/2022 | |
| CN | 114900945 A | * | 8/2022 | ............... H05H 1/24 |
| CN | 114900945 A | | 8/2022 | |

* cited by examiner

*Primary Examiner* — Srinivas Sathiraju

(57) ABSTRACT

A dielectric barrier discharge tube includes a quartz tube, the middle of the quartz tube is sleeved with a high-voltage electrode, an inner electrode is arranged in the quartz tube, a drive fan is arranged at the end of the inner electrode, a discharging needle set is arranged on the surface of the inner electrode, and a spiral discharging wire is suspended and arranged at the tip of the discharging needle set. After a high voltage electric field is applied to the high voltage electrode, the discharging needle set and the spiral discharging wire discharge, the discharging needle set and the spiral discharging wire discharge at different time points. When the gas passes through the driving fan, the flow direction of the gas is changed. A cyclone can be generated to drive the gas to flow towards the discharging area.

4 Claims, 2 Drawing Sheets

NEEDLE-BASED SYNERGISTIC DOUBLE HELIX ELECTRODE DIELECTRIC BARRIER DISCHARGING TUBE

CROSS REFERENCE TO RELATED APPLICATIONS

The present application claims priority of Chinese Patent Application No. 202310123450.9, filed on Feb. 16, 2023, the entire contents of which are hereby incorporated by reference in their entireties.

TECHNICAL FIELD

The present disclosure relates to the field of DBD reactors, and in particular to a needle-based synergistic double helix electrode dielectric barrier discharging tube.

BACKGROUND

The plasma technology is an advanced technology having potential advantages in the field of treating environmental pollution. A principle of the plasma technology treating pollutants is as follows. When an external electric field is applied, media discharge to generate a large number of energy-carrying electrons, and the generated electrons bombard molecules of the pollutants, such that the bombarded molecules are ionized, dissociated, and excited. Further, a series of complex physical and chemical reactions are triggered, such that complex large-molecule pollutants are converted into simple small-molecule safe substances, or toxic and harmful substances are converted into non-toxic and non-hazardous or low-toxic substances, and therefore, the pollutants may be degraded and depleted.

A tubular plasma reactor is a dielectric barrier discharging device. An inner electrode is placed in a reaction tube. An outer electrode (high-voltage electrode) sleeves an outside of the reaction tube. The inner electrode may be in various forms. In the art, the inner electrode may be cylindrical coaxial or needle-tip typed. The cylindrical coaxial electrode may have several variants. For example, for a coaxial typed reactor, a discharging area covers the entire target gas, and a better treatment effect can be achieved. However, the discharging area is narrower, and a large amount of energy may be consumed. For the needle-tip typed reactor, a discharging needle is disposed on the inner electrode, such that a tip of the discharging needle discharges, and the gas may be ionized and treated by the discharging needle when flowing through the reaction tube. For example, for a plasma discharging rod, a plurality of discharging needles are arranged on a surface of the discharging rod. In this way, a size of a target gas channel is increased, a discharging voltage is reduced, and intensity of high-energy particles at the same voltage may be increased. However, while using the plasma discharging rod in practice, the discharging needle discharges through the tip of the needle, and that is, static tip discharging is performed. Therefore, only the gas, which flows through or is disposed near the tip of the discharging needle, can be better ionized. An area between needle sets is a blank area. Although a treatment area may be increased by arranging various needle sets spirally, the treatment effect on the target gas located at a bottom area of the needle sets and located in the area between the needle sets may not be achieved. Therefore, an efficiency and an effect of treating the gas is not ideal.

SUMMARY OF THE DISCLOSURE

The present disclosure provides a needle-based synergistic double helix electrode dielectric barrier discharging tube.

In this way, a contact area between the target gas and the high-energy ions is increased, discharging uniformity is improved, a discharging area inside the quartz tube is increased, and a cyclone is generated to allow the gas to flow towards the discharging area, and the treatment effect on the gas is improved.

The present disclosure provides a, including a quartz tube, wherein a high voltage electrode is sleeved at a central part of the quartz tube, an inner electrode is arranged inside the quartz tube, the end of the inner electrode is arranged with a drive fan, a discharging needle set is arranged on a surface of the inner electrode, a spiral discharging wire is suspended and disposed at a tip of each discharging needle of the discharging needle set.

After a high voltage field is applied to the high voltage electrode, both the discharging needle set and the spiral discharging wire may discharge, such that the discharging area inside the quartz tube is increased. Further, the discharging needles are discharging at different time points, the treatment effect on the target gas and adaptability to the target gas may be improved. When the gas passes through the drive fan, a flowing direction of the gas may change, such that the airflow is disturbed, a range where the target gas contacts the high energy particles inside the quartz tube is increased, and the treatment effect is further improved. When a flow rate of the target gas increases, the drive fan is impacted by the airflow and rotates to drive the inner electrode to rotate to further drive the discharging needle set and the spiral discharging wire to rotate. In this way, static tip discharging performed by the discharging needle set and the wire discharging performed by the spiral discharging wire cooperatively form dynamic stereo discharging. Under a same power, the treatment area and the spatial discharging uniformity on the target gas is further improved. Furthermore, the spiral discharging wire may generate a cyclone when rotating, allowing the gas to flow towards the tips of the discharging needle set and the area where the spiral discharging wire is located, improving the treatment effect on the target gas.

In the needle-based synergistic double helix electrode dielectric barrier discharging tube as described in the above, the discharging needle set includes a first needle set and a second needle set, each of the first needle set and the second needle set comprises two discharging needles; the spiral discharging wire extends spirally to wind around each first needle set successively.

In the needle-based synergistic double helix electrode dielectric barrier discharging tube as described in the above, a front discharging wire is suspended and arranged at a tip of each needle of the second needle set, a length of the front discharging wire is shorter than a length of the spiral discharging wire.

In the needle-based synergistic double helix electrode dielectric barrier discharging tube as described in the above, a vertical distance from the spiral discharging wire to the surface of the inner electrode is equal to a height of the discharging needle, and a vertical distance from the front discharging wire to the surface of the inner electrode is equal to a height of the discharging needle.

In the needle-based synergistic double helix electrode dielectric barrier discharging tube as described in the above, the first needle set and the second needle set extend across each other.

In the needle-based synergistic double helix electrode dielectric barrier discharging tube as described in the above, each of the spiral discharging wire and the front discharging wire has a flat cross section.

In the present disclosure, a drive fan is arranged at the end of the inner electrode, a discharging needle set is disposed on the surface of the inner electrode, and a spiral discharging wire is suspended and arranged on the tip of each discharging needle of the needle set. After the high voltage electric field is applied to the high voltage electrode, both the discharging needle set and the spiral discharging wire may discharge. Compared to the related art in which the discharging is performed at the needle tip and the discharging is performed coaxially, in the present disclosure, the discharging performed at the needle tip is combined with the discharging performed at the discharging wires. The contact area between the target gas and the high energy ions is increased while the size of the target gas channel is maintained. The discharging uniformity is enhanced, and the discharging area inside the quartz tube is increased. Further, along with the driving voltage strength, the needle tip and spiral wire perform discharging at different time points, such that different driving voltages may be applied for gases of different concentrations and different flow rates, and the overall treatment effect and efficiency on the gas is improved. When the gas passes through the drive fan, the flowing direction of the gas may change, such that the airflow is disturbed, the range of high-energy particles contacting the target gas in the quartz tube is increased, improving the treatment effect. When the flow rate of the target gas increases, the drive fan is impacted by the airflow to rotate to drive the inner electrode to rotate to further drive the discharging needle set and the spiral discharging wire to rotate. In this way, the static tip discharging performed by the discharging needle set and the wire discharging performed by the spiral discharging wire cooperatively form dynamic stereo discharging. Under a same power, the treatment area and the spatial discharging uniformity on the target gas is further improved. Furthermore, the spiral discharging wire may generate a cyclone when rotating, allowing the gas to flow towards the tips of the discharging needle set and the area where the spiral discharging wire is located, improving the treatment effect on the target gas.

In the present disclosure, a front discharging wire is suspended and arranged at the tip of each needle of the second needle set. A length of the front discharging wire is shorter than a length of the spiral discharging wire. Further, the front discharging wire is disposed on a side in the quartz tube near the gas inlet. In this way, when the device treats the gas in medium to high concentration, a two-stage treatment on the gas may be achieved inside the same quartz tube. That is, the front section of the quartz tube treats the gas in the medium to high concentration more effectively. Highly intensive discharging is performed locally to reduce the gas concentration, and the gas in the reduced concentration is subsequently uniformly treated. In this way, a better treatment effect is achieved compared to a uniform treatment throughout the entire process. In addition, when the inner electrode is rotating, the front discharging wire may rotate accordingly, further improving the turbulence effect.

Figure 1:
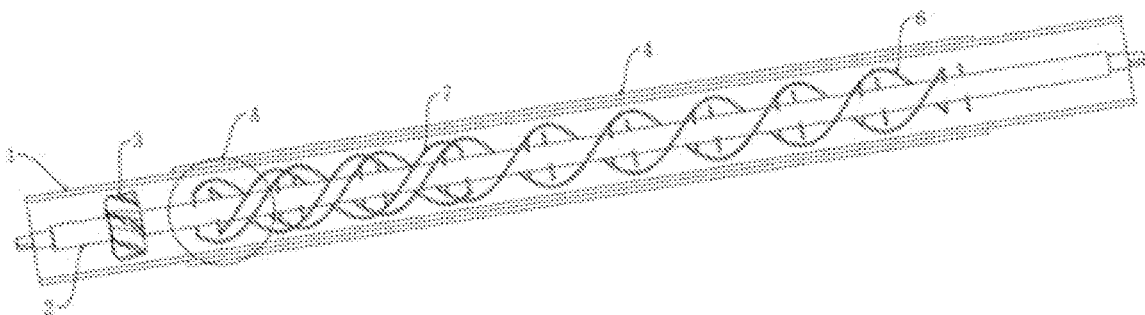
FIG. 1 is a structural schematic view of the structure according to the embodiment of the present disclosure.

Reference numerals in the drawings: 1—Quartz tube; 2—Inner electrode; 3—Drive fan; 4—High voltage electrode; 5—Discharging needle set; 501—First needle set; 502—Second needle set; 6—Spiral discharging wire; 7—Front discharging wire.

DETAILED DESCRIPTION

The present disclosure is further described below by referring to the accompanying drawings and embodiments, but is not intended to limit the present disclosure.

Figure 2:
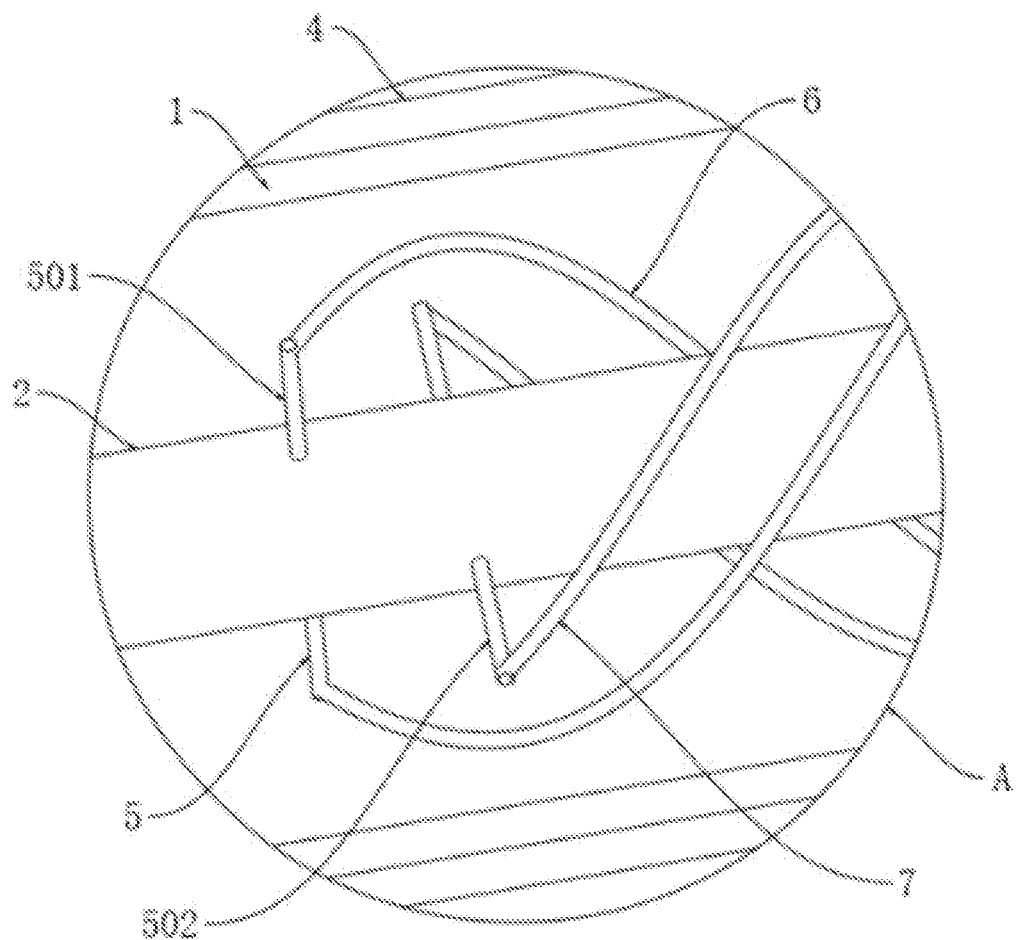
FIG. 2 is an enlarged view of the portion A shown in FIG. 1.

Embodiments: A needle-based synergistic double helix electrode dielectric barrier discharging tube is provided, as shown in the FIG. 1. The tube includes a quartz tube 1. A high voltage electrode 4 is sleeved at a central part of the quartz tube 1. The high voltage electrode 4 is a stainless steel mesh. An inner electrode 2 is arranged inside the quartz tube 1. The inner electrode 2 is made of aluminum. The end of the inner electrode 4 is arranged with a drive fan 3. The drive fan 3 is made of insulating material. The drive fan 3 is disposed at a gas inlet end of the quartz tube 1. A discharging needle set 5 is arranged on a surface of the inner electrode 2. The discharging needle set 5 is made of stainless steel. As shown in FIG. 2, the discharging needle set 5 includes a first needle set 501 and a second needle set 502. Each of the first needle set 501 and the second needle set 502 includes two discharging needles. The first needle set 501 and the second needle set 502 extend across each other. A spiral discharging wire 6 is disposed at a tip of each discharging needle of the discharging needle set 5. The spiral discharging wire 6 extends spirally to wind around each first needle set 501 successively. The number of discharging needles 5 and the number of spiral discharging wires 6 can be determined according to actual needs. In the present embodiment, two spiral discharging wires 6 are arranged, and the two spiral discharging wires 6 cooperatively form a double helix structure.

A front discharging wire 7 is suspended and arranged at a tip of each needle of the second needle set 502. A length of the front discharging wire 7 is shorter than a length of the spiral discharging wire 6. Further, the front discharging wire 7 is disposed on a side in the quartz tube 1 near a gas inlet. Each of a vertical distance from the spiral discharging wire 6 to the surface of the inner electrode 2 and a vertical distance from the front discharging wire 7 to the surface of the inner electrode 2 is equal to a height of the discharging needle.

After the high voltage field is applied to the high voltage electrode 4, both the discharging needle set 5 and the spiral discharging wire 6 discharge. Specifically, a high voltage power supply drives the discharging needle set 5 and the spiral discharging wire 6 to discharge. Due to different curvatures, the discharging needle set 5 discharges firstly, and the voltage increases continually, the spiral discharging wire 6 starts to discharge. Compared to the related art in which discharging is performed at a point of the discharging needle set 5, in the present disclosure, discharging from the tip of the needle of the discharging needle set 5 is combined with discharging from the spiral discharging wires 6, such that a discharging area inside the quartz tube 1 is increased, and the treatment effect on the target gas and adaptability to the target gas are improved.

Figure 3:
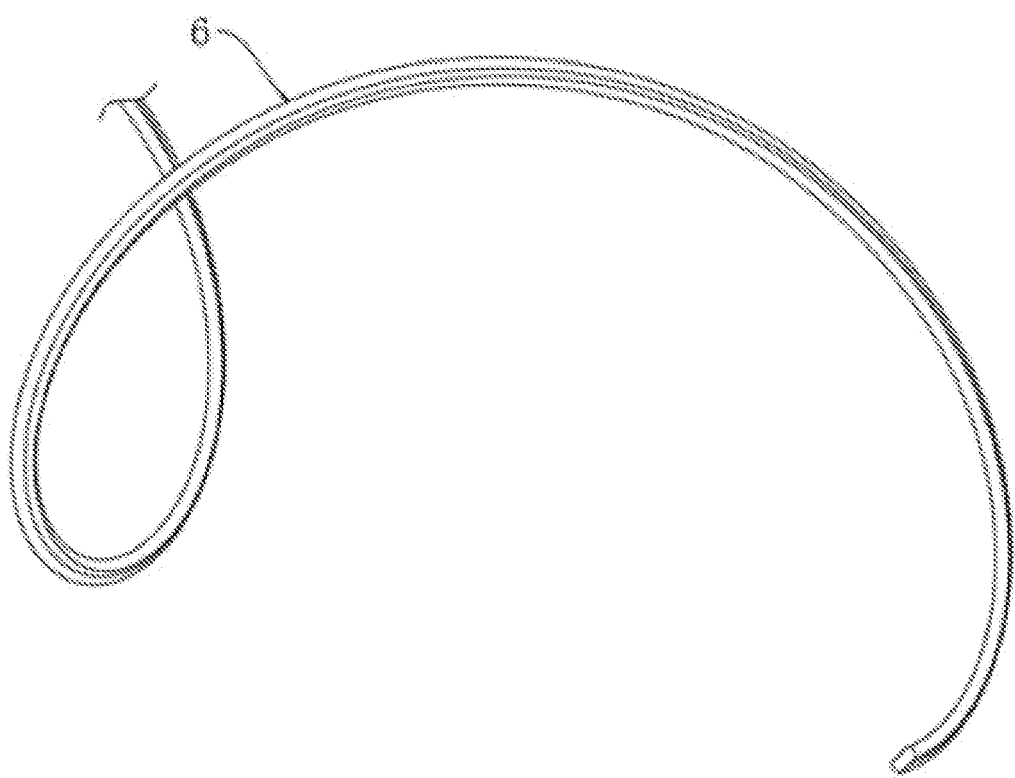
FIG. 3 is a structural schematic view of the spiral discharging wire according to the embodiment of the present disclosure.

When a flow rate of the gas is low, the flowing direction of the gas may change as the gas passes through the drive fan 3, such that the airflow is disturbed, increasing the range of the target gas contacting the energetic particles in the quartz tube 1 and further improving the treatment effect. In this case, the drive fan 3 may not rotate. When the flow rate of the target gas increases, the drive fan 3 is impacted by the airflow to rotate to drive the inner electrode 2 to rotate to further drive the discharging needle set 5 and the spiral discharging wire 6 to rotate. In this way, the static tip discharging performed by the discharging needle set 5 and the wire discharging performed by the spiral discharging wire 6 cooperatively form dynamic stereo discharging. Under a same power, the treatment area and the spatial discharging uniformity on the target gas is further improved. Furthermore, the spiral discharging wire 6 may generate a cyclone when rotating, allowing the gas to flow towards the tips of the discharging needle set 5 and the area where the spiral discharging wire 6 is located, improving the treatment effect on the target gas. Further, as shown in FIG. 3, each of the spiral discharging wire 6 and the front discharging wire 7 has a flat cross section. When the spiral discharging wire 6 and the front discharging wire 7 having the flat cross sections rotate, the airflow may be disturbed more effectively, directing the gas to flow towards the tip of the needle of the discharging needle set 5 and towards the area where the spiral discharging wire 6 and the front discharging wire 7 are located.

Further, since the front discharging wire 7 is arranged at a front of the quartz tube 1, when the device treats the gas in medium to high concentration, a two-stage treatment on the gas may be achieved inside the same quartz tube 1. That is, the front section of the quartz tube 1 treats the gas in the medium to high concentration more effectively. Highly intensive discharging is performed locally to reduce the gas concentration, and the gas in the reduced concentration is subsequently uniformly treated. In this way, a better treatment effect is achieved compared to a uniform treatment throughout the entire process.

The above description shows only preferred embodiments of the present disclosure and is not intended to limit the present disclosure. Any ordinary skilled person in the art may perform modifications and variations on the present disclosure. Any modification, equivalent substitution, improvement, and so on, that does not depart away from the essence of the present disclosure shall be included within the scope of the present disclosure.

What is claimed is:

1. A needle-based synergistic double helix electrode dielectric barrier discharging tube, comprising: a quartz tube, wherein a high voltage electrode is sleeved at a central part of the quartz tube, an inner electrode is arranged inside the quartz tube, the end of the inner electrode is arranged with a drive fan, a discharging needle set is arranged on a surface of the inner electrode, a spiral discharging wire is suspended and disposed at a tip of each discharging needle of the discharging needle set; the discharging needle set comprises a first needle set and a second needle set, each of the first needle set and the second needle set comprises two discharging needles; the spiral discharging wire extends spirally to wind around each first needle set successively;

after a high voltage field is applied to the high voltage electrode, both the discharging needle set and the spiral discharging wire discharge, a discharging area inside the quartz tube is increased, the discharging needle set and the spiral discharging wire perform discharging at different time points, a treatment effect on a target gas and adaptability to the target gas are improved;

when the gas passes through the drive fan, a flowing direction of the gas changes, an airflow is disturbed, increasing a range of the target gas contacting energetic particles in the quartz tube and further improving the treatment effect;

when a flow rate of the target gas increases, the drive fan is impacted by the airflow to rotate to drive the inner electrode to rotate to further drive the discharging needle set and the spiral discharging wire to rotate, static tip discharging performed by the discharging needle set and wire discharging performed by the spiral discharging wire cooperatively form dynamic stereo discharging; under a same power, the treatment area and the spatial discharging uniformity on the target gas is further improved; the spiral discharging wire is configured to rotate to allow the gas to flow towards tips of the discharging needle set and towards an area where the spiral discharging wire is located, improving the treatment effect on the target gas;

a vertical distance from the spiral discharging wire to the surface of the inner electrode is equal to a height of the discharging needle.

2. The needle-based synergistic double helix electrode dielectric barrier discharging tube according to claim 1, wherein a front discharging wire is suspended and arranged at a tip of each needle of the second needle set, a length of the front discharging wire is shorter than a length of the spiral discharging wire, the front discharging wire is disposed at a side in the quartz tube near a gas inlet, a vertical distance from the front discharging wire to the surface of the inner electrode is equal to a height of the discharging needle.

3. The needle-based synergistic double helix electrode dielectric barrier discharging tube according to claim 2, wherein each of the spiral discharging wire and the front discharging wire has a flat cross section.

4. The needle-based synergistic double helix electrode dielectric barrier discharging tube according to claim 1, wherein the first needle set and the second needle set extend across each other.

* * * * *